United States Patent [19]
Meynier et al.

[11] Patent Number: 6,089,345
[45] Date of Patent: Jul. 18, 2000

[54] ELASTIC WAVE EXPLORATION TOOL FOR WELLS

[75] Inventors: Patrick Meynier, Chatou; Charles Naville; Sylvain Serbutoviez, both of Paris, all of France

[73] Assignee: Insitut Francais du Petrole, Cedex, France

[21] Appl. No.: 09/059,352

[22] Filed: Apr. 14, 1998

[30] Foreign Application Priority Data

Apr. 14, 1997 [FR] France ................................. 97 04656

[51] Int. Cl.$^7$ ..................................................... G01V 1/40
[52] U.S. Cl. ....................... 181/102; 181/101; 181/102; 181/106; 181/113; 181/115; 181/117; 181/122; 367/144; 367/162; 367/3; 367/5; 367/82; 367/23; 367/16; 367/145; 367/146
[58] Field of Search ..................................... 181/102, 101, 181/106, 113, 115, 117, 122; 367/144, 162, 3, 5, 82, 23, 16, 145, 146

[56] References Cited

U.S. PATENT DOCUMENTS

| | | | |
|---|---|---|---|
| 4,006,794 | 2/1977 | Itria | 181/115 |
| 4,858,718 | 8/1989 | Chelminski | 181/106 |
| 5,170,018 | 12/1992 | Potier | 181/101 |
| 5,537,364 | 7/1996 | Howlett | 367/57 |
| 5,852,262 | 12/1998 | Gill et al. | 181/106 |

FOREIGN PATENT DOCUMENTS 2285685 7/1995 United Kingdom ............. G01V 1/40

*Primary Examiner*—Robert E. Nappi
*Assistant Examiner*—Edgardo San Martin
*Attorney, Agent, or Firm*—Antonelli, Terry, Stout & Kraus, LLP

[57] ABSTRACT

A well tool in accordance with the invention comprises an attenuation device which attenuates tube waves associated with an elastic wave emission and/or reception set (1, 12). The attenuation device comprises a bubble generator (2) which releases into the well a gas not readily soluble in the well fluid, slightly overpressured in relation to the hydrostatic pressure, in the form of calibrated bubbles which greatly attenuate the parasitic tube waves. The attenuation device is placed above or below the elastic wave emission and/or reception set having a plurality of pickups whose signals are acquired by a local electronic module (14) and/or a source of elastic waves such as a vibrator. A bubble trap (17) is preferably associated with the bubble generator (2) in order to limit the volume of gas to be generated in situ. The invention is applicable to VSP type seismic prospecting and acoustic logging.

32 Claims, 5 Drawing Sheets

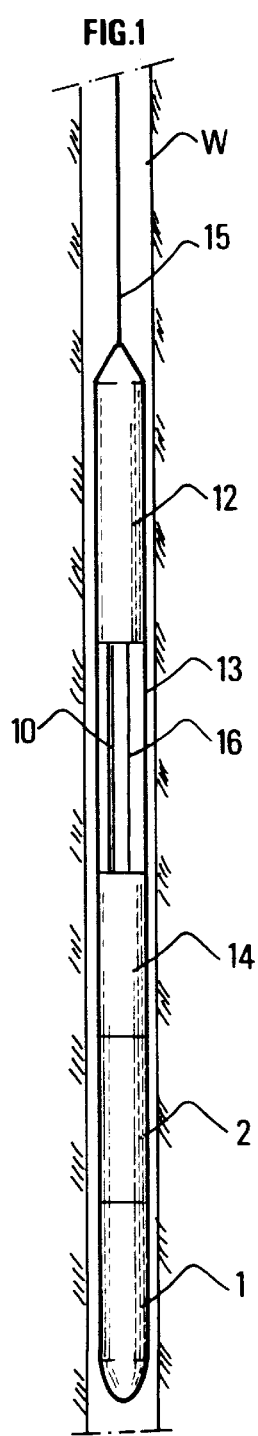
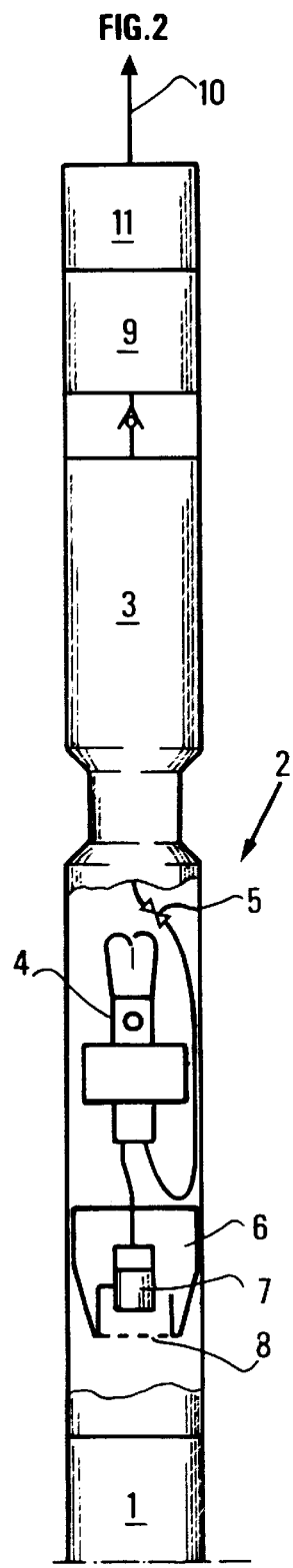
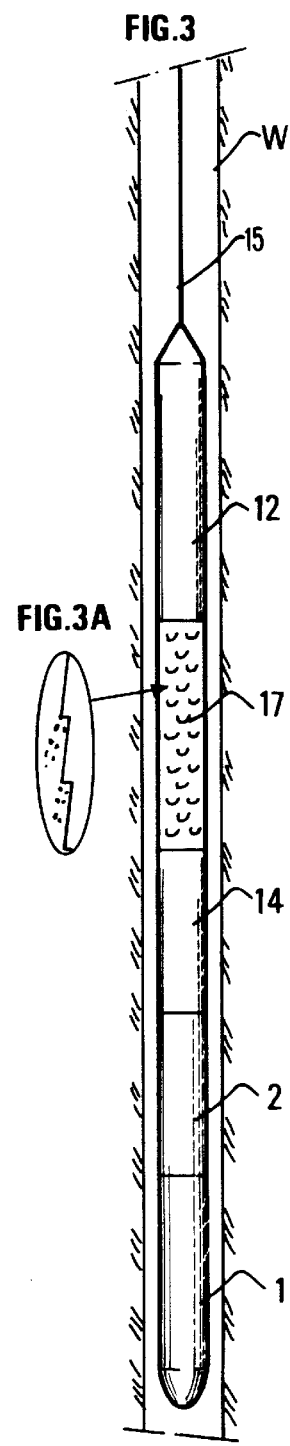

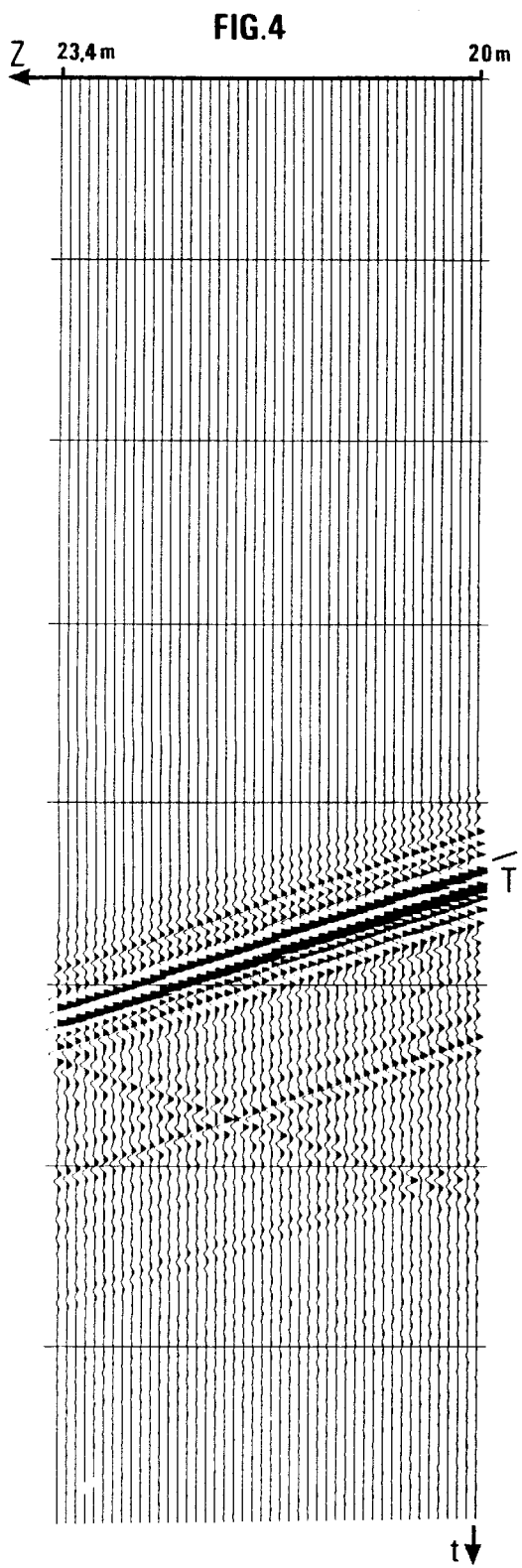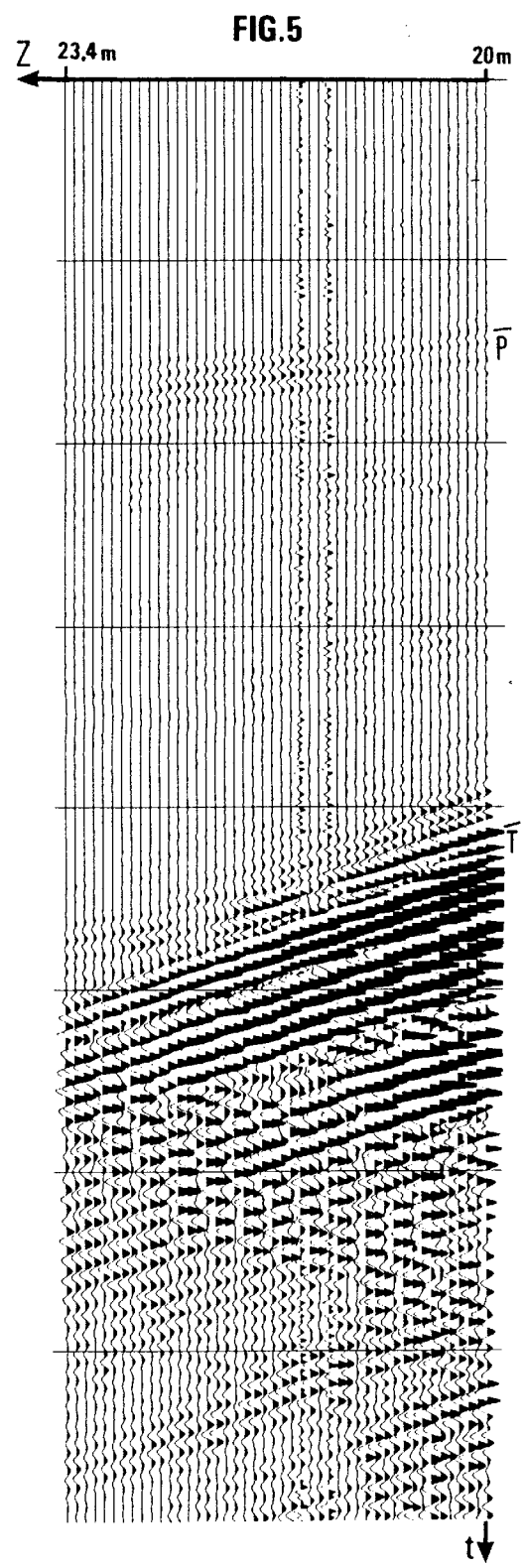

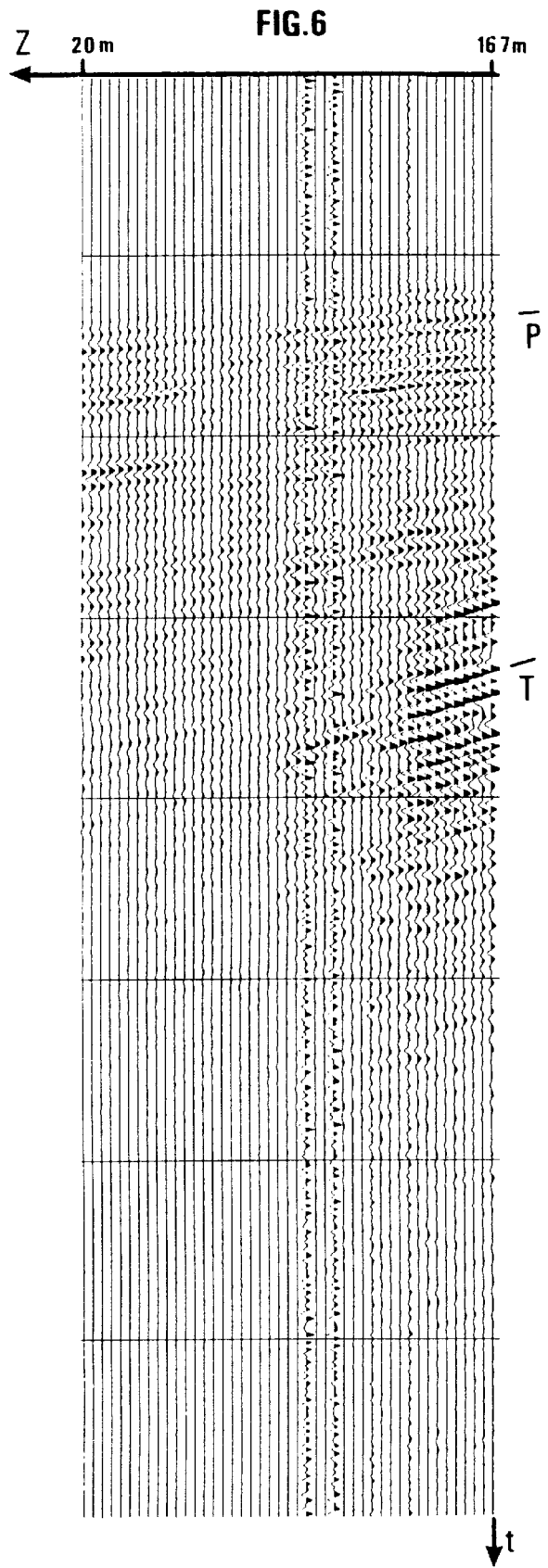

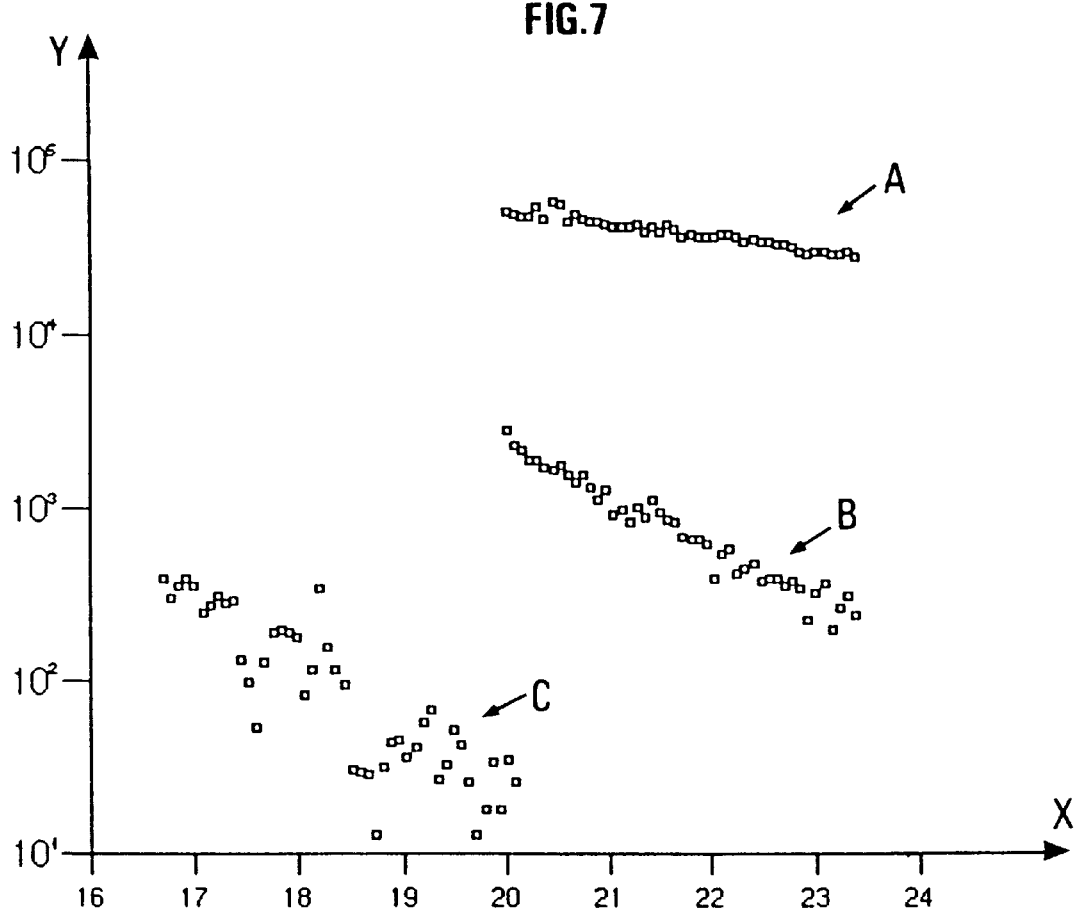

ELASTIC WAVE EXPLORATION TOOL FOR WELLS

BACKGROUND OF THE INVENTION

1. Field of the Invention

The present invention relates to a well tool combining a source of elastic waves, a device which attenuates tube waves propagating along a well as a result of the emission of (seismic or acoustic) elastic waves in the well and optionally a reception set for picking up waves reflected by the discontinuities of the formations surrounding the well.

2. Description of the Prior Art

There are many well-known applications notably in low or high resolution seismic prospecting, sonic logging, etc, where the formations surrounding a well are explored by emitting waves by means of a well source and by recording the waves received by receivers placed in the same well for example, in another well or at the ground surface.

It is also well-known that emission of useful waves is accompanied by the formation of guided waves known as tube waves which propagate along the well. These guided waves are inconvenient notably because they mask certain signals reflected by the discontinuities of the surrounding formations.

A well-known process for attenuating the effects of guided waves, as described in U.S. Pat. No. 4,858,718 uses well seismic equipment comprising an impulsive source lowered in a well, associated with an attenuation means. It consists of an inflatable bladder placed above the source and connected to a local compressed gas tank or to a surface tank by means of a supply line.

French Patent FR-2,714,486 filed by the applicant notably describes another method allowing great reduction of tube waves which propagate along a well containing a liquid and which are responsible for the parasitic signals picked up by seismic receivers coupled with an underground formation crossed by the well. This method mainly consists in performing seismic prospecting operations after dispersion in the liquid, in the upper part of the well, of a substantially liquid-insoluble gas sufficiently compressible to absorb at least part of the energy carried by the tube waves towards the seismic receivers. According to an embodiment, the gas is obtained by means of a chemical reaction set off at the surface and conveyed to the desired depth by means of a tube. The constituents of the chemical reaction can also be conveyed to the desired depth separately and combined to produce the gas. The latter can also be obtained by exploding, at the required depth, an explosive charge notably based on nitromethane for example.

SUMMARY OF THE INVENTION

The well tool according to the invention is suited for exploration of formations surrounding a well by means of elastic waves. The well tool comprises at least one elastic wave emission or reception set connected to a self-contained gas generator provided with a pressure control means and delivering in the well fluid on demand, calibrated gas bubbles suited to efficiently attenuate the tube waves propagating in the well.

The self-contained gas generator comprises for example an expansion valve in order to deliver a gas with a predetermined overpressure in relation to the pressure prevailing in the well at the selected depth and a porous filter for calibrating the dimensions of the bubbles ejected.

According to an embodiment, the gas generator comprises a combustion chamber for a gas-generating pyrotechnical substance and a tank for the gas generated by the combustion.

The gas generator comprises for example a distributor for pyrotechnical substance cartridges and a trigger for triggering off the combustion of a new cartridge in the combustion chamber when the pressure of the gas in the tank falls below a predetermined threshold value.

According to a preferred embodiment, a gas bubble trap is associated with the gas generator.

To that effect, an element exhibiting discontinuities (holes, scales, rough patches, meshes, honeycombs, etc) in which bubbles lodge themselves is for example used, and this element can be added to a portion of the tool.

According to an embodiment, the tool comprises an elastic wave emission and reception set.

According to another embodiment, the emission or reception set and the gas generator are secured to each other and combined within a single body.

The well tool comprises for example a reception set including a plurality of elastic wave receivers which is connected to the emission module, the gas generator being interposed between the source and the reception module.

In this case, an electronic module is preferably associated therewith for acquisition of the signals delivered by the receivers of the reception module, and the tool is connected to a surface installation by means of a electrically conductive cable.

With this combination of a self-contained gas generator coupled with an elastic wave emission and/or reception set, the prior dependence on a gas supply or on gas-generating substances no longer exists and the tool can be lowered at any depth required for prospecting.

BRIEF DESCRIPTION OF THE DRAWINGS

Other features and advantages of the well tool according to the invention will be clear from reading the description hereafter of an embodiment given by way of non limitative example, with reference to the accompanying drawings wherein:

FIG. 1 diagrammatically shows a well tool suited for elastic wave emission-reception cycles with tube wave attenuation, FIG. 2 diagrammatically shows a calibrated bubble generator, FIGS. 3 and 3A show another embodiment where the attenuation device comprises a bubble trap such as scales or rough patches on a wall, FIGS. 4, 5 and 6 show, by way of comparison, three sets of seismic traces, the first one (FIG. 4) being obtained without tube wave attenuation, the second (FIG. 5) by using the bubble generator and with attenuation of these tube waves over a first distance of attenuation by the gas, and the third (FIG. 6) over a greater distance, FIG. 7 shows by comparison how the attenuation A of the tube waves varies with the distance D between the seismic source and the receivers in the three cases illustrated by FIGS. 4–6.

DETAILED DESCRIPTION OF THE INVENTION

Figure 8:
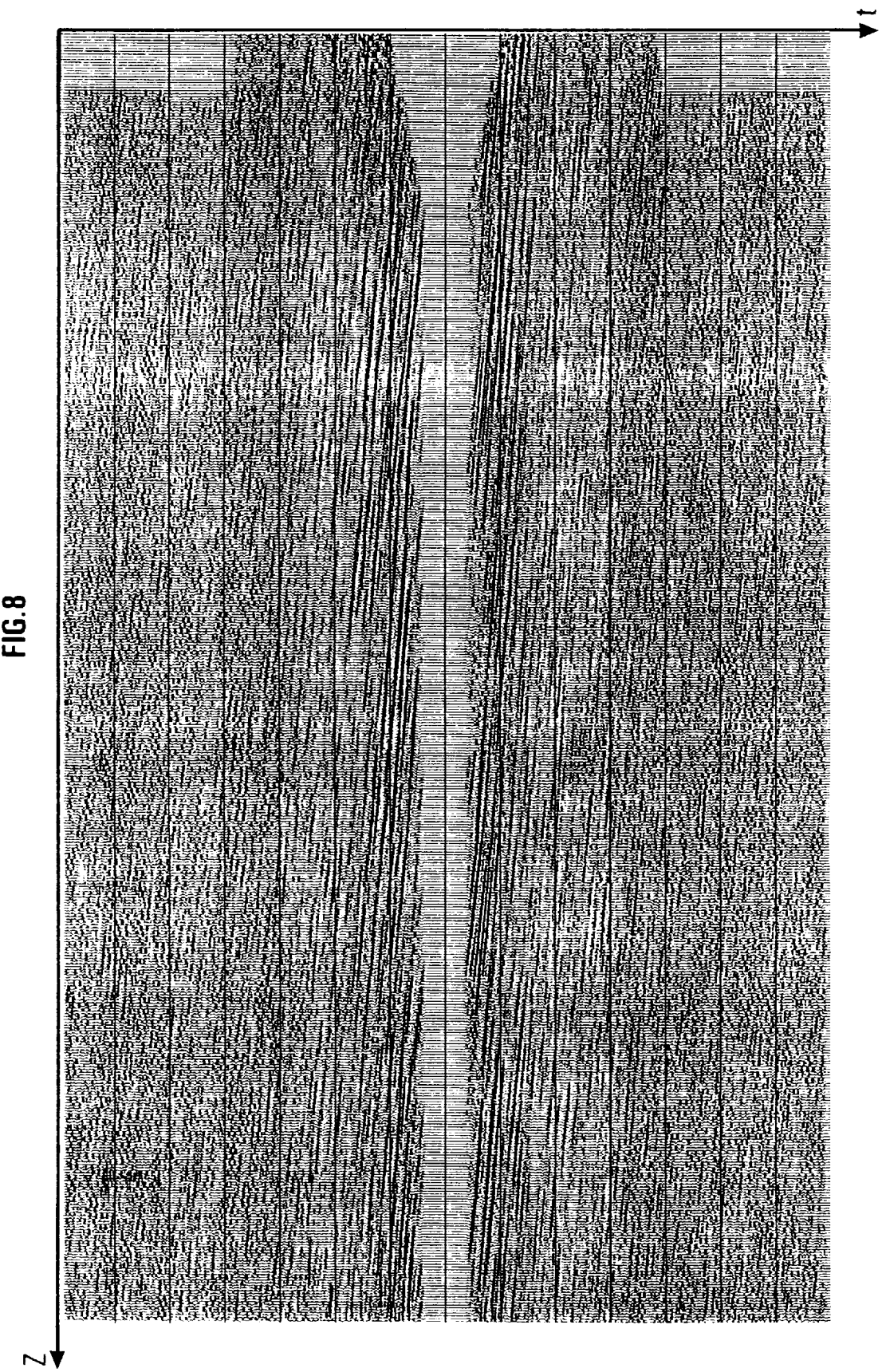
FIG. 8 illustrates the clarification provided by the injection of gas into the mud for a seismic image of a formation surrounding a horizontal well.

The complete emission-reception set diagrammatically shown in FIG. 1 is lowered into a well W. It comprises a source of elastic waves 1 such as a piezoelectric vibrator. A gas bubble generator 2 comprising (FIG. 2) a tank 3 delivering a gas substantially insoluble in the liquid contained in the well, is placed above the vibrator, in the same tool body for example. The tank communicates with an ejection piece 6 opening onto the outside by means of an expansion valve 4 and of a control solenoid valve 5. The outlet pressure of expansion valve 4 is adjusted so as to maintain a certain overpressure in relation to the hydrostatic pressure, of the order of 20 kPa for example. The gas coming from expansion valve 4 flows through a porous filter 7 made from agglomeration of a metallic powder for example and flows out through a grate 8 in the form of a cloud of bubbles of calibrated diameter.

Gas tank 3 communicates with a combustion chamber 9 where cartridges containing pyrotechnical substances selected to generate the required gas can be burnt. Substances used by car equipment manufacturers for inflating airbags, such as $NaN_3$ for example, can be used to generate nitrogen.

When the pressure in the tank falls below a certain threshold value, it is refilled with gas by triggering off electrically from the surface the firing of a new cartridge in combustion chamber 9 by means of a control line 10.

A cartridge distributor 11 of a well-known type can be associated with the gas generator to feed the combustion chamber.

In the embodiment described the well tool comprises an elastic wave reception set 12 placed on the side of gas generator 2 opposite source 1, at a certain distance therefrom, selected according to the type of application. The reception set is connected to the assembly made up of source 1 and bubble generator 2 either by an electrocarrying cable length or by rigid braces 13.

In this case, the well tool comprises an electronic module 14 of a well-known type placed for example in the same body as the emission set. This module receives, by means of a linking cable 15, the signals picked up by reception set 12. It is suited to digitize the signals prior to transmitting them in coded form to a surface station (not shown). The electronic modules used may for example be those described in French Patents 2,613,159 and 2,613,496.

Within the scope of an application for high-resolution seismic prospecting, a source 1 consisting of a piezoelectric vibrator is for example used. The reception set joined to the emission set by braces 13 is for example a well streamer consisting of an elongate sheath filled with a liquid along which hydrophones (not shown) are arranged at regular intervals. At the top of the streamer, an electrically conductive cable with seven conductors 15 connects the set to the surface station. Electronic module 14 is connected to the lines of electrically conductive cable 15 by a multiconductor cable 16 (which may be an electrically conductive cable element for example). This is also the case for control line 10 trigger reconstitution of the gas reserve in tank 3 by combustion of a cartridge.

The beneficial effects on the readability of the sets of traces, obtained by operating the bubble generator, immediately appear to specialists from seeing FIGS. 4, 5, 6, 7.

In FIG. 4, which shows a constant gain playback (0 dB) of a set of 46 seismic traces of a unitary record obtained without injecting gas into the well mud, by varying the distance between the source and the receivers stepwise between 20 m and 23.4 m, it can be seen that the body pressure wave propagated in the formation is invisible because it is too weak in relation to the tube wave which is only attenuated by 1.5 dB per meter.

On the corresponding record of FIG. 5 (34 dB constant gain playback), obtained by releasing gas 1.8 m below the position of reception of the closest trace, the body pressure wave (P) is clearly visible because the tube wave (T) undergoes an attenuation of 6 dB per meter as a result of the attenuation provided by the gas bubbles.

The corresponding record of FIG. 6 was obtained with a 50 dB playback gain for source-receiver distances ranging between 16.3 and 19.8 m, the gas being injected 4.8 m below the position of reception of the closest trace. The tube wave (T) is attenuated at the rate of 6 dB/m and the pressure wave (P), which propagates in the formation, becomes dominant because the distance covered by the tube wave in the gasified mud is greater than in the previous case.

The effects of the attenuation provided by injecting gas into the mud, as a function of the attenuation distance, clearly appear in FIG. 7. Graph (A) corresponds to the effect of a mud without gas, and graphs (B) and (C) to the effect of a gasified mud, the attenuation distance being respectively 1 m and 3.5 m as in FIGS. 4–6.

The record of FIG. 8 shows a seismic image of a formation readable over a depth of some 20 m on either side above and below a horizontal well, obtained by gasifying the mud, a depth of investigation which would have been only some meters without the highly efficient attenuation provided by the gas bubbles.

An integrated elastic wave emission and reception set in a well has been described. However, for certain VSP type prospecting operations for example, it is obvious that the tool movable in the well and suspended by cable 15 may comprise only reception set 12 associated with bubble generator 2, the source of elastic waves 1 being movable separately in the same well or placed at the surface or in another well.

According to the embodiment of FIG. 3, the tool further comprises a bubble trap 17 intended to retain a good proportion of the gas bubbles from bubble generator 2 or to retard the rising thereof. To that effect, a bracing tube 13 provided with a bubble trap preventing the rising thereof can be interposed between electronic module 14 and reception set 12. Examples of possible traps are:
- rough patches or surface unevenness provided on the outer surface of the tube or on a sheath added to this element, notably scales (FIG. 3A),
- a honeycomb coating, or
- a textile packing externally covering the tube, suited to retain bubbles in the meshes thereof.

According to a preferred embodiment, the bubble traps 17 are placed between source 1 and the array of receivers 12 so as to attenuate direct propagations from one to the other. However, it is clear that it is possible to place the bubble traps above and/or below the reception set, for example in order to attenuate waves converted into tube waves, notably when the source of elastic waves is placed at the surface or in another well.

Without departing from the scope of the invention, electrically conductive cable 15 can be replaced by any other device which connects the tool to a surface installation, or the relative layout of the well tool elements with respect to one another can be changed and gas generator 2 can for example be placed below the source of elastic waves 1.

The device according to the invention according to the configuration thereof, is suited for many conventional applications, for example:
a) high-resolution seismic prospecting or logging with a tool comprising a seismic source, a reception set and a bubble generator;

b) VSP type seismic prospecting, either direct with a surface seismic source and a reception set associated with the bubble generator in the well, or of reversed VSP type with a seismic source and a bubble generator in the well and surface receivers; or c) seismic prospecting from one well to another.

What is claimed is:

1. A well tool which is lowered into a well containing well fluid which is used for exploration of formations surrounding the well by use of elastic waves comprising at least one elastic wave emission or reception set, a self-contained gas generator provided with a pressure control and which delivers to the well fluid, on demand, calibrated gas bubbles which attenuate tube waves propagating in the well, an expansion valve which delivers gas at a predetermined overpressure in relation to pressure prevailing in the well at a selected depth, and a porous filter which calibrates dimensions of the calibrated gas bubbles and wherein the gas generator comprises a combustion chamber in which a gas-generating pyrotechnic substance is combusted, and a tank for containing the gas generated by combustion of the pyrotechnical substance.

2. A well tool as claimed in claim 1, further comprising a distributor for pyrotechnical substance cartridges and a trigger which triggers combustion of pyrotechnical substance cartridges in the combustion chamber when pressure of the gas in the tank falls below a predetermined threshold value.

3. A well tool as claimed in claim 1, wherein the emission or reception set and gas generator are secured to each other and combined within a single body.

4. A well tool as claimed in claim 1, wherein the well tool comprises a reception set including a plurality of elastic wave receivers, which is connected to an emission module, and the gas generator is located between an elastic wave emission set and a reception set.

5. A well tool as claimed in claim 1, further comprising an electronic module which acquires signals delivered by the reception set, which is connected to a surface installation by an electrically conductive cable.

6. A well tool as claimed in claim 2, further comprising a gas bubble trap for trapping gas bubbles in the well fluid.

7. A well tool as claimed in claim 6, wherein the gas bubble trap comprises an element exhibiting discontinuities in which the bubbles lodge themselves.

8. A well tool as claimed in claim 7, wherein the element is a coating of a portion of the tool.

9. A well tool which is lowered into a well containing well fluid which is used for surveying formations surrounding the well comprising at least one unit for transmitting or receiving elastic waves, a self-contained gas generator connected with the at least one unit for transmitting or receiving elastic waves, and having a pressure-regulator and a control valve for releasing into the well fluid on command gas bubbles calibrated to attenuate tube waves propagating in the well fluid.

10. A well tool as claimed in claim 9, wherein the generator includes an expansion valve which delivers gas at a pressure higher than a pressure prevailing in the well at the depth at which the tool is positioned and a porous filter which calibrates a size of the released gas bubbles.

11. A well tool as claimed in claim 9, further comprising an element with a surface having discontinuities which trap gas bubbles in the well fluid.

12. A well tool as claimed in claim 9, further comprising a coating on a portion of the emission or reception set having a surface with discontinuities which trap the gas bubbles.

13. A well tool as claimed in claim 10, further comprising an element with a surface having discontinuities which trap gas bubbles in the well fluid.

14. A well tool as claimed in claim 10, further comprising a coating on a portion of the emission or reception set having a surface with discontinuities which trap the gas bubbles.

15. A well tool which is lowered into a well containing well fluid which is used for surveying formations surrounding the well comprising at least one unit for transmitting or receiving elastic waves, a self-contained gas generator connected with the at least one unit, and having a combustion chamber for a pyrotechnic substance which generates gas when combusted in the combustion chamber and a tank for storing the gas generated by the combustion of the pyrotechnic substance, a pressure regulator and a control valve which releases into the well fluid on command gas bubbles calibrated to attenuate tube waves propagating in the well fluid.

16. A well tool as claimed in claim 15, further comprising a distributor for cartridges of the pyrotechnic substance which generates the gas and a trigger for triggering combustion of a cartridge in the combustion chamber when gas pressure in the tank falls below a determined fixed threshold.

17. A well tool as claimed in claim 15, further comprising an element with a surface having discontinuities which trap the gas bubbles.

18. A well tool as claimed in claim 15, further comprising a coating on a portion of the emission or reception set having a surface with discontinuities which trap the gas bubbles.

19. A well tool as claimed in claim 15, wherein the at least one unit comprises a transmitting and a receiving unit and the self-contained gas generator are in one body.

20. A well tool as claimed in claim 19, wherein the at least one unit comprises a plurality of elastic wave receivers, a transmitter module coupled to the receiver module, and wherein the gas generator is disposed between the transmitter module and the plurality of receivers.

21. A well tool as claimed in claim 16, further comprising a coating on a portion of the emission or reception set having a surface with discontinuities which trap the gas bubbles.

22. A well tool as claimed in claim 16, wherein the at least one unit comprises a transmitting and a receiving unit and the self-contained gas generator are in one body.

23. A well tool as claimed in claim 22, wherein the at least one unit comprises a plurality of elastic wave receivers, a transmitter module coupled to the receiver module, and wherein the gas generator is disposed between the transmitter module and the plurality of receivers.

24. A well took which is lowered into a well containing well fluid which is used for surveying formations surrounding the well comprising at least one unit for transmitting or receiving elastic waves, a self-contained gas generator connected with the at least one unit, and having a combustion chamber for a pyrotechnic substance which generates gas when combusted in the combustion chamber, a tank for storing the gas generated by combustion of the pyrotechnic substance, a pressure regulator, a control valve which releases into the well fluid on command gas bubbles calibrated to attenuate tube waves propagated in the well fluid, an expansion valve which delivers gas at a given pressure higher than the pressure prevailing in the well at the depth at which the tool is positioned, and a porous filter which calibrates a size of the released gas bubbles.

25. A well tool as claimed in claim 24, further comprising a distributor for cartridges of the pyrotechnic substance which generates the gas and a trigger for triggering combustion of a cartridge in the combustion chamber when gas pressure in the tank falls below a determined fixed threshold.

26. A well tool as claimed in claim 24, further comprising an element with a surface having discontinuities which trap the gas bubbles.

27. A well tool as claimed in claim 24, further comprising a coating on a portion of the emission or reception set having a surface with discontinuities which trap the gas bubbles.

28. A well tool as claimed in claim 24, wherein the at least one unit comprises a transmitting and a receiving unit and the self-contained gas generator are incorporated in one body.

29. A well tool as claimed in claim 28, wherein the at least one unit comprises a plurality of elastic wave receivers, a transmitter module coupled to the receiver module, and wherein the gas generator is disposed between the transmitter module and the plurality of receivers.

30. A well tool as claimed in claim 25, wherein the at least one unit comprises a transmitting and a receiving unit and the self-contained gas generator are in one body.

31. A well tool as claimed in claim 30, wherein the at least one unit comprises a plurality of elastic wave receivers, a transmitter module coupled to the receiver module, and wherein the gas generator is disposed between the transmitter module and the plurality of receivers.

32. A well tool which is lowered into a well containing well fluid which is used for surveying formations surrounding the well comprising at least one unit for transmitting and receiving elastic waves, a self-contained gas generator connected with the at least one unit, and having a pressure-regulator and a control valve which releases into the well fluid on command gas bubbles calibrated to attenuate tube waves propagated in the well fluid.

* * * * *